United States Patent [19]

Sakemi

[11] Patent Number: 5,713,201
[45] Date of Patent: Feb. 3, 1998

[54] TORQUE CONVERTER WITH MOVABLE NOZZLE

[76] Inventor: Hiroyuki Sakemi, 10-10-1101 2-chome, Minami, Azabu, Minato-ku, Tokyo, Japan

[21] Appl. No.: 382,983

[22] Filed: Feb. 3, 1995

[30] Foreign Application Priority Data

Jun. 8, 1994 [JP] Japan .................... 6-159070

[51] Int. Cl.$^6$ ............................ F16D 33/02; F01B 25/02
[52] U.S. Cl. .................... 60/352; 60/347; 415/167
[58] Field of Search .................... 60/330, 347, 352, 60/353, 354, 355, 356; 415/202, 167

[56] References Cited

U.S. PATENT DOCUMENTS

| | | | |
|---|---|---|---|
| 1,972,602 | 9/1934 | Robbins | 60/352 |
| 3,845,623 | 11/1974 | DeLancey | 60/425 |

FOREIGN PATENT DOCUMENTS 383928  8/1973  Russian Federation ............ 60/352

*Primary Examiner*—John E. Ryznic
*Attorney, Agent, or Firm*—Westman, Champlin & Kelly, P.A.

[57] ABSTRACT

The present invention includes a centrifugal pump powered by an engine. A hose is connected to the centrifugal pump at a pump outlet. An injection nozzle is connected at the other end of the hose. A controller is operable to move the nozzle. A turbine is directly connected to an output shaft. Power oil is provided by the pump, through the hose, to the injection nozzle. The turbine receives the injected power oil from the nozzle and transmits power to the output shaft.

6 Claims, 3 Drawing Sheets

TORQUE CONVERTER WITH MOVABLE NOZZLE

BACKGROUND OF THE INVENTION

The present invention relates to torque converters. More specifically, the present invention relates to torque converters having a movable nozzle.

The most popular torque converters used with current automotive transmission systems are typically composed of three elements: an impeller, a turbine and a stater. However, such torque converters are capable of generating an output torque which is at most 2.5 times the input torque. Therefore, it is difficult to use such torque convertors, by themselves, for applications in the automotive industry which require at least 4 to 5 times torque increase. Rather, auxiliary gear transmission systems must be attached to obtain the extra torque increase required.

However, the auxiliary gear transmission presents problems of its own. The auxiliary gear transmission is not continuously variable. This requires shift change systems which demand sophisticated oil control mechanics and which also add great weight to the automobile.

Another problem with conventional torque converters is that the efficiency of torque conversion is not satisfactory. This is due to the existence of slip between the pump impeller and turbine.

Further, in order to control the shift change in the oil system, many oil valves are required which are actuated by power oil. The power is supplied by an oil pump which is continuously powered by the engine.

SUMMARY OF THE INVENTION

The present invention is drawn to a centrifugal pump powered by an engine. A hose is connected to the centrifugal pump at a pump outlet. An injection nozzle is connected at another end of the hose. A controller is operable to move the nozzle. A turbine is connected to an output shaft. Power oil is provided by the pump, through the hose, to the injection nozzle. The turbine receives the injected power oil from the nozzle and transmits power to the output shaft. The nozzle is movable relative to the turbine.

The present invention addresses problems associated with conventional torque converters. The present oil pump and oil turbine can generate 1 to 5 times output torque versus input torque without using any auxiliary gear transmission.

Further, the present invention includes other advantages such as light weight, compact size, and energy savings by eliminating the auxiliary gear transmission and the oil pump for valve control.

DETAILED DESCRIPTION OF THE PREFERRED EMBODIMENTS

Figure 1:
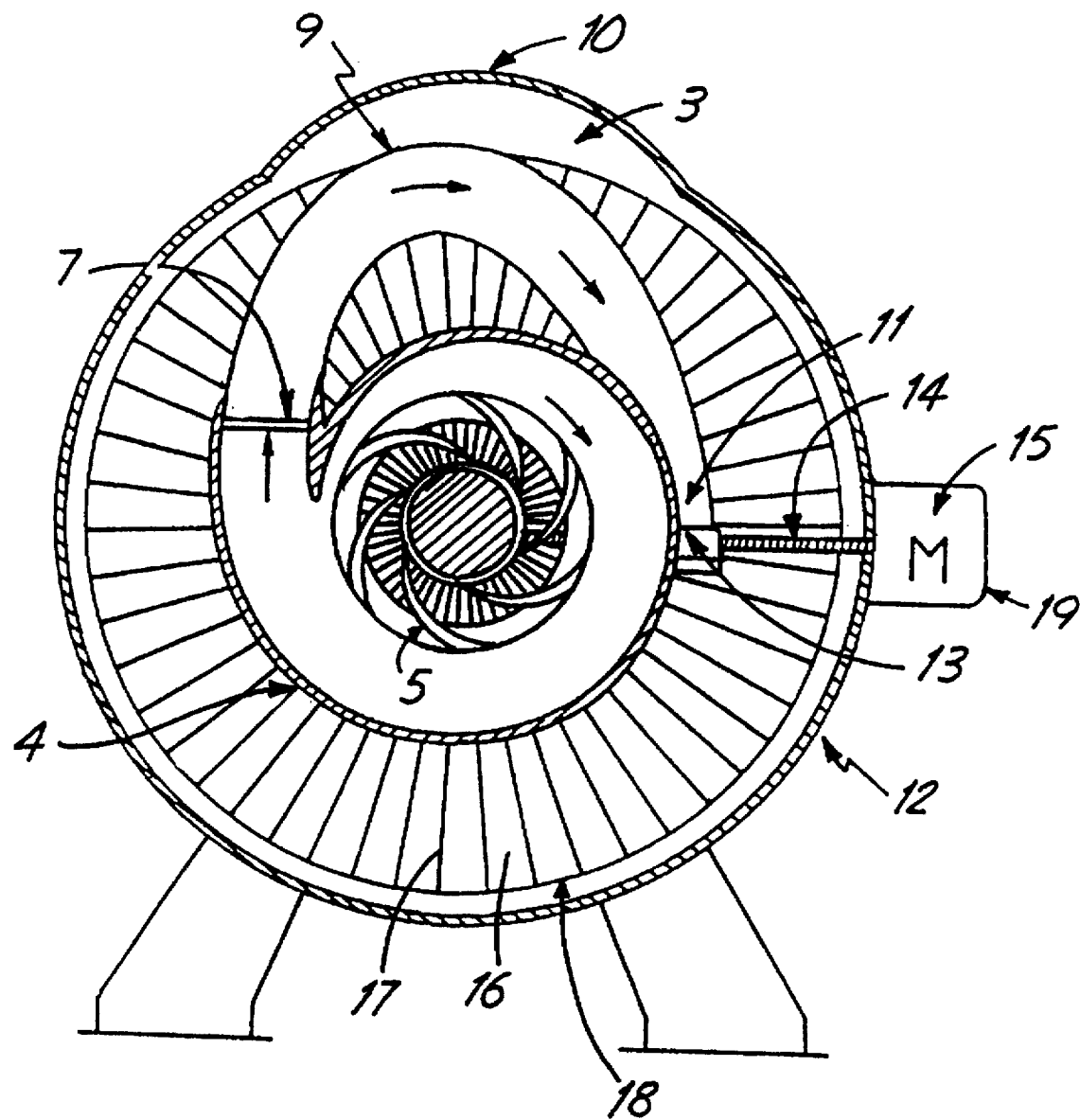
FIG. 1 is a front view of a torque converter according to the present invention with a turbine housing and centrifugal pump housing removed.
Figure 2:
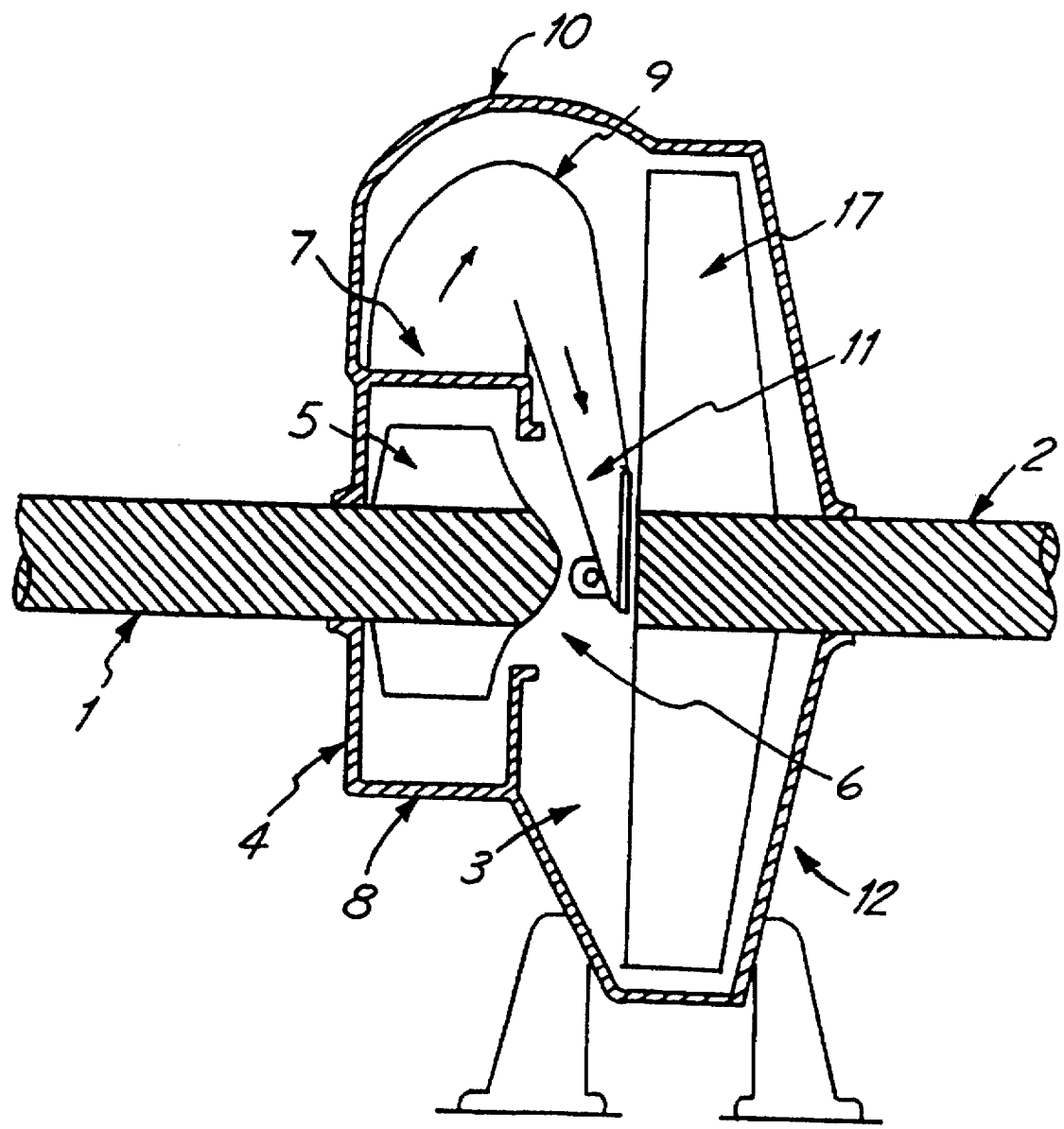
FIG. 2 is a sectional view of a torque converter according to the present invention taken along section lines 2—2 in FIG. 1.

FIGS. 1 and 2 are a front view and side sectioned view, respectively, of a torque converter according to the present invention. The torque converter includes an input shaft 1, and an output shaft 2. The input shaft 1 is coupled to a centrifugal pump 4 which pumps oil 3 through a hose 9. Hose 9 includes a nozzle 11 placed proximate a plurality of turbine blades 17 which are, in turn, coupled to output shaft 2.

Centrifugal pump 4 includes impeller 5. Centrifugal pump 4 provides power to the oil which fills the pump housing 8 by providing the oil under pressure from the pump housing 8 through a pump outlet 7 and into hose 9. The powered oil 3 is guided through hose 9 and injected, through an injection nozzle 11 coupled hose 9, to turbine blades 17 to apply a rotation force to turbine blades 17. As blades 17 rotate, the turbine blades 17 provide rotation power to output shaft 2 which causes rotation of output shaft 2.

After supplying the power to turbine 16 (and turbine blades 17), the powered oil 3 returns to pump housing 8 through an inlet 6 to pump 4. In doing so, the powered oil 3 passes through the gap among the turbine blades 17 and through the gap between the turbine 16 and turbine housing 12. The oil 3 is then drawn into pump housing 8, through inlet 6, by impeller 5. Centrifugal pump 4 then again pumps the oil out through outlet 7 into hose 9 as described above.

The present invention also provides that the torque converter is continuously variable in its transmission operation. This is provided by moving the position of nozzle 11 relative to turbine blades 17.

To move the position of nozzle 11, one preferred embodiment of the present invention uses the combination of a nut 13 (fixedly attached to nozzle 11) and a bolt 14 which is movably attached to housing 12. Bolt 14 is also connected to, and controlled by, a servo-motor 15. Servo-motor 15 has its output shaft connected to bolt 14 so that rotation of the output shaft of servo-motor 15 causes rotation of bolt 14. Rotation of bolt 14, in turn, interacts with the threadably engaged nut 13 attached to the nozzle 11. In order to move the nozzle position back and forth radially with respect to turbine blades 17, servo-motor 15 simply rotates in one direction or the other, and the nut 13 follows bolt 14 radially outwardly or inwardly relative to turbine blade 17, depending upon the direction of rotation of bolt 14.

Servo-motor 15 includes a control unit 19 which controls servo-motor 15 for positioning nozzle 11 in the desired radial position relative to blades 17. The control unit 19 preferably includes a microprocessor suitable for computing an optimum position for nozzle 11 based on various real-time data supplied by any number of suitable sensors. Upon determining the optimum position of nozzle 11, control unit 19 controls servo-motor 15 to rotate in a desired direction so that nozzle 11 is located at the desired position.

By changing the position of nozzle 11, the power oil 3 is guided to, and injected against, turbine blades 17 at different radial positions. The output torque at the different positions, and the output torque supplied to the output shaft, is thus increased or decreased in proportion to the distance between a longitudinal axis of the output shaft 2 and the position of nozzle 11. In other words, when nozzle 11 is positioned at the innermost radius of turbine blades 17, the output torque is at a minimum. Conversely, when nozzle 11 is positioned at the outermost radial position of turbine blades 17, the output torque is at a maximum.

Also, the angular velocity of output shaft 2 is provided in inverse proportion to the distance between the longitudinal axis of the output shaft 2 and the radial position of nozzle 11. In other words, the angular velocity of output shaft 2 is maximized when nozzle 11 is positioned at the innermost radial position of turbine blades 17, and it is maximized when nozzle 11 is positioned at the outermost radial position of turbine blades 17.

Accordingly, by changing the position of the nozzle 11 with respect to turbine blades 17, the output torque increases while the angular velocity of output shaft 2 decreases, and the output torque decreases with an increase in the angular velocity of output shaft 2. These variations are accomplished continuously since the position of nozzle 11 is continuously movable.

Figure 3:
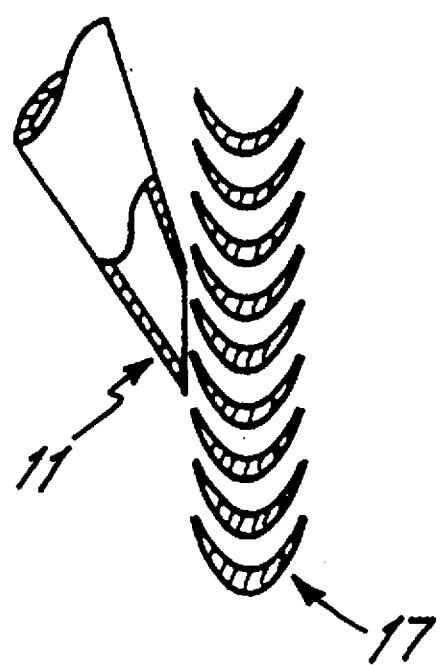
FIG. 3 is a view of a spout nozzle and turbine blades according to the present invention.

FIG. 3 shows that turbine blades 17 have a curved shape along their cross-section. Therefore, the powered oil 3 from nozzle 11 is injected into turbine blades 17, and the direction of the flow of oil 3 is reversed by the curvature of the blades 17, without any disturbance in oil flow. When the oil flow direction is reversed by turbine blades 17, the power supplied to the oil by pump 4 is converted to rotational power of the output shaft 2.

While the microprocessor in control unit 19 is suitable for computing the position of nozzle 11 in accordance with the desired output torque, it is also worth noting that the microprocessor and control unit 19 can also compute other desired characteristics, such as the angular velocity of the output shaft 2. These desired characteristics (e.g., angular velocity of the output shaft, and the output torque) are computed based on such things as the angular velocity of input shaft 1, the angular velocity of output shaft 2, the position of the automobile accelerator, and any other suitable factors. Based upon these factors, the microprocessor outputs an appropriate instruction to the servo-motor 15 to move the nozzle 11 to the desired position.

It is also worth noting that the present invention can be used in conjunction with well known reverse gear mechanisms to accomplish reverse rotation. Such reverse rotation may be desired in some applications.

In case a lock-up function is required, or desired, the present invention lends itself well to such a function. A lock-up function can be accomplished by employing any known lock-up clutch between input shaft 1 and output shaft 2. Also, conventional mechanisms can be employed to switch between connection and disconnection of impeller 5 in centrifugal pump 4 from input shaft 1.

The present invention includes a number of advantages. First, using the present invention allows the elimination of the auxiliary gear transmission. Further, the present invention provides stepless torque conversion (or continuously variable torque conversion). The present invention provides this in a mechanism which is simple and low cost and which lends itself to mass production. Further, the present invention is light in weight and compact in size and provides high energy efficiency in substantially any range of transmission ratios.

Although the present invention has been described with reference to preferred embodiments, workers skilled in the art will recognize that changes may be made in form and detail without departing from the spirit and scope of the invention.

What is claimed is:

1. A torque converter, comprising:

a centrifugal pump, connected to an input shaft which is configured to be driven by an engine;

a hose connected at a first end to the centrifugal pump;

an injection nozzle connected to a second end of the hose;

a turbine having a plurality of turbine blades positioned to receive oil from the injection nozzle;

a controller coupled to move the injection nozzle relative to the turbine; and an output shaft connected to the turbine.

2. A torque converter, comprising:

a pump connectable to an input shaft which is driveable by an engine and configured to pump oil as the input shaft rotates;

a conduit having a first end connected to the pump to receive the oil, and a second end;

a turbine having a plurality of turbine blades and arranged such that oil passing through the second end of the conduit impinges on the turbine blades, the turbine being connectable to an output shaft; and a controller coupled to the second end of the conduit to move the second end radially relative to the turbine blades.

3. The torque converter of claim 2 wherein the controller comprises:

a motor coupled to the second end of the conduit to drive movement of the second end.

4. The torque converter of claim 3 wherein the second end of the conduit comprises a nozzle.

5. The torque converter of claim 4 wherein the controller further comprises:

a bolt rotatably driven by the motor; and a nut attached to the nozzle and threadably engaging the bolt.

6. The torque converter of claim 2 wherein the conduit comprises:

a hose.

* * * * *